United States Patent [19]

Iwasaki

[11] Patent Number: 5,243,255
[45] Date of Patent: Sep. 7, 1993

[54] CATHODE-RAY TUBE WITH LOW REFLECTIVITY FILM

[75] Inventor: Yasuo Iwasaki, Nagaokakyo, Japan

[73] Assignee: Mitsubishi Denki Kabushiki Kaisha, Tokyo, Japan

[21] Appl. No.: 780,283

[22] Filed: Oct. 22, 1991

[30] Foreign Application Priority Data

Oct. 24, 1990 [JP] Japan .................... 2-288239
May 13, 1991 [JP] Japan .................... 3-106988

[51] Int. Cl.⁵ .......................................... H01J 29/88
[52] U.S. Cl. .................................. 313/478; 313/112;
313/473; 313/479; 358/253; 359/581; 359/587; 359/588
[58] Field of Search ............... 313/478, 479, 474, 473, 313/112; 358/253, 252, 311; 359/577, 580, 587, 589, 588, 581

[56] References Cited

U.S. PATENT DOCUMENTS

| | | | |
|---|---|---|---|
| 3,504,212 | 3/1970 | Wollentin et al. | 313/374 |
| 4,634,926 | 1/1987 | Vriens et al. | 313/474 |
| 4,732,454 | 3/1988 | Saito et al. | 359/580 |
| 4,747,674 | 5/1988 | Butterfield et al. | 359/589 X |
| 4,798,994 | 1/1989 | Rijpers et al. | 313/478 |
| 4,804,883 | 2/1989 | Miller et al. | 313/478 |
| 4,831,307 | 5/1989 | Takenaka et al. | 313/474 X |
| 4,846,551 | 7/1989 | Rancourt et al. | 350/589 |
| 4,945,282 | 7/1990 | Kawamura et al. | 313/479 |
| 5,051,652 | 9/1991 | Isomura et al. | 313/479 |
| 5,122,709 | 6/1992 | Kawamura et al. | 313/479 |

FOREIGN PATENT DOCUMENTS

| | | |
|---|---|---|
| 0246696 | 11/1987 | European Pat. Off. |
| 0288982 | 11/1988 | European Pat. Off. |
| 0335680 | 10/1989 | European Pat. Off. |
| 0445686 | 9/1991 | European Pat. Off. |
| 59-212503 | 10/1984 | Japan |
| 63-196091 | 8/1988 | Japan |

*Primary Examiner*—Donald J. Yusko
*Assistant Examiner*—Ashok Patel

[57] ABSTRACT

A cathode-ray tube includes a face plate having a light transmittance of at most 50% and a reflectivity reduction film formed on the external surface of the face plate to reduce reflectivity of an external light. The reflectivity reduction film is a low refraction index layer formed by using a coating liquid obtained by dispersing and mixing magnesium fluoride superfine particles to a base coating of an alcohol solution containing a silicon alkoxide. The low refraction index layer can be laminated by a high refraction index layer formed by using a coating liquid obtained by dispersing and mixing tantalum oxide fine particles to the same base coating as that of the low refraction index layer.

17 Claims, 19 Drawing Sheets

| | EXTERNAL LIGHT INTENSITY | REFLECTED LIGHT INTENSITY | | SURFACE REFLECTION RATE |
|---|---|---|---|---|
| | $E_0$ | $E_1$ | $E_2$ | $\frac{E_1}{E_1+E_2} \times 100$ |
| (k) CLEAR FACE PLATE (85%T) | 100 | 4.0 | 33.3 | 10.7 |
| (l) GRAY FACE PLATE (69%T) | 100 | 4.0 | 21.9 | 15.4 |
| (m) TINT FACE PLATE (50%T) | 100 | 4.0 | 11.5 | 25.8 |
| (n) DARK TINT FACE PLATE (38%T) | 100 | 4.0 | 6.7 | 37.4 |
| (o) TINT FACE PLATE (50%T) + LIGHT ABSORPTION FILM (80%T) | 100 | 4.0 | 7.4 | 35.1 |
| (p) DARK TINT FACE PLATE (38%T) + LIGHT ABSORPTION FILM (80%T) | 100 | 4.0 | 4.3 | 48.2 |

FACE PLATE THICKNESS : 13.0mm
EXTERNAL LIGHT INCANDESCENT LAMP
( ) INSIDE IS TRANSMITTANCE

Fig. 7

| | | EXTERNAL LIGHT INTENSITY | REFLECTED LIGHT INTENSITY | | SORFACE REFLECTION RATE |
|---|---|---|---|---|---|
| | | $E_0$ | $E_1$ | $E_2$ | $\frac{E_1}{E_1+E_2} \times 100$ |
| (m1) | TINT FACE PLATE (50%T) + REFLECTIVITY REDUCTION FILM (100%T) | 100 | 1.5 | 12.5 | 10.7 |
| (n1) | DARK TINT FACE PLATE (38%T) + REFLECTIVITY REDUCTION FILM (100%T) | 100 | 1.5 | 7.2 | 17.2 |
| (o1) | TINT FACE PLATE (50%T) + REFLECTIVITY REDUCTION LIGHT ABSORPTION FILM (80%T) | 100 | 1.5 | 8.0 | 15.8 |
| (p1) | DARK TINT FACE PLATE (38%T) + REFLECTIVITY REDUCTION LIGHT ABSORPTION FILM (80%T) | 100 | 1.5 | 4.6 | 24.6 |

Fig. 11

FACE PLATE THICKNESS : 13.0mm
EXTERNAL LIGHT INCANDESCENT LAMP
( ) INSIDE IS TRANSMITTANCE

| | | EXTERNAL LIGHT INTENSITY | REFLECTED LIGHT INTENSITY | | SURFACE REFLECTION RATE |
| --- | --- | --- | --- | --- | --- |
| | | $E_0$ | $E_1$ | $E_2$ | $\dfrac{E_1}{E_1+E_2}\times 100$ |
| (m2) | TINT FACE PLATE (50%T) <br> + <br> REFLECTIVITY REDUCTION FILM (b) (100%T) | 100 | 1.2 | 12.2 | 9.0 |
| (n2) | DARK TINT FACE PLATE (38%T) <br> + <br> REFLECTIVITY REDUCTION FILM (b) (100%T) | 100 | 1.2 | 7.0 | 14.6 |
| (o2) | TINT FACE PLATE (50%T) <br> + REFLECTIVITY REDUCTION (b) (80%T) <br> LIGHT ABSORPTION FILM | 100 | 1.2 | 7.8 | 13.3 |
| (p2) | DARK TINT FACE PLATE (38%T) <br> + REFLECTIVITY REDUCTION (b) (80%T) <br> LIGHT ABSORPTION FILM | 100 | 1.2 | 4.5 | 21.1 |

FACE PLATE THICKNESS : 13.0mm
EXTERNAL LIGHT INCANDESCENT LAMP
( ) INSIDE IS TRANSMITTANCE

Fig. 14

| | | EXTERNAL LIGHT INTENSITY | REFLECTED LIGHT INTENSITY | | SURFACE REFLECTION RATE |
| --- | --- | --- | --- | --- | --- |
| | | E0 | E1 | E2 | $\frac{E_1}{E_1+E_2} \times 100$ |
| (m3) | TINT FACE PLATE (50%T)<br>+ REFLECTIVITY REDUCTION FILM (c) (100%T) | 100 | 0.5 | 12.4 | 3.9 |
| (n3) | DARK TINT FACE PLATE (38%T)<br>+ REFLECTIVITY REDUCTION FILM (c) (100%T) | 100 | 0.5 | 7.1 | 6.6 |
| (o3) | TINT FACE PLATE (50%T)<br>+ REFLECTIVITY REDUCTION (c)<br>LIGHT ABSORPTION FILM (80%T) | 100 | 0.5 | 7.9 | 6.0 |
| (p3) | DARK TINT FACE PLATE (38%T)<br>+ REFLECTIVITY REDUCTION (c)<br>LIGHT ABSORPTION FILM (80%T) | 100 | 0.5 | 4.6 | 9.8 |

FACE PLATE THICKNESS : 13.0mm
EXTERNAL LIGHT INCANDESCENT LAMP
( ) INSIDE IS TRANSMITTANCE

Fig. 16

| | EXTERNAL LIGHT INTENSITY | REFLECTED LIGHT INTENSITY | | SURFACE REFLECTION RATE |
|---|---|---|---|---|
| | $E_0$ | $E_1$ | $E_2$ | $\dfrac{E_1}{E_1+E_2} \times 100$ |
| (m4) | TINT FACE PLATE (50%T) <br> + <br> REFLECTIVITY REDUCTION FILM (d) (100%T) | 100 | 0.8 | 12.3 | 6.1 |
| (n4) | DARK TINT FACE PLATE (38%T) <br> + <br> REFLECTIVITY REDUCTION FILM (d) (100%T) | 100 | 0.8 | 7.1 | 10.1 |
| (o4) | TINT FACE PLATE (50%T) <br> + REFLECTIVITY REDUCTION (d) (80%T) <br> LIGHT ABSORPTION FILM | 100 | 0.8 | 7.9 | 9.2 |
| (p4) | DARK TINT FACE PLATE (38%T) <br> + REFLECTIVITY REDUCTION (d) (80%T) <br> LIGHT ABSORPTION FILM | 100 | 0.8 | 4.5 | 15.1 |

FACE PLATE THICKNESS : 13.0mm
EXTERNAL LIGHT INCANDESCENT LAMP
( ) INSIDE IS TRANSMITTANCE

Fig. 18

CATHODE-RAY TUBE WITH LOW REFLECTIVITY FILM

BACKGROUND OF THE INVENTION i) Field of the invention

The present invention relates to a cathode-ray tube with a low reflectivity film, which is formed with a reflectivity reduction film for reducing the reflectivity of an external light on a face plate.

ii) Description of the Related Arts

Recently, a demand for picture quality of a color TV receiver has been increased, and hence a large improvement of contrast efficiency of a cathode-ray tube has been also demanded.

Before explaining this contrast efficiency, firstly, a construction of a fluorescent part of a cathode-ray tube will now be described.

FIG. 1 shows a cross section of the fluorescent surface part of the cathode-ray tube. In FIG. 1, on an internal surface of a face plate 2, a dark color light absorption film 6, a BGR (blue, green and red) three primary color fluorescent material layer 4 and a metal back film 5 are formed for improving the contrast efficiency by reducing reflectivity of an external light of the fluorescent surface.

Now, in the above-described cathode-ray tube, by assuming an emission luminance $F_o$ of the fluorescent surface; an output luminance $F_1$ of a light passing through the face plate 2; a light transmittance $Tp$ of the face plate 2; a summarized fluorescent film reflectivity $Rp$ of the dark color light absorption film 6, the BGR three color fluorescent material layer 4 and the metal back film 5; an opening rate $Tb$ of the dark color light absorption film 6; an intensity $E_o$ of a light incident to the fluorescent surface; an intensity $E_1$ of a surface reflection external light reflected by the external surface of the face plate 2; and an intensity $E_2$ of a fluorescent surface reflection external light coming out of the face plate 2 by reflecting by the internal surface and the fluorescent film of the face plate 2, a contrast index $Ct$ exhibiting the contrast efficiency (strength) can be expressed by the following formula:

$$Ct = \frac{(E_1 + E_2) + F_1}{E_1 + E_2} = 1 + \frac{F_1}{E_1 + E_2} \quad (1)$$

wherein $$F_1 = F_o \cdot Tb \cdot Tp \quad (2)$$

$$E_1 = 0.04 E_o \quad (3)$$

$$E_2 = (0.96)^2 E_o \cdot Tp^2 \{0.04 + (0.96)^2 Rp\} \quad (4)$$

In the above-described formulas, since the material of the face plate 2 is glass, the surface reflection at the interface between the air and the vacuum is estimated at 4%. Since $E_1$ is constant from formula (3), in order to improve the contrast efficiency or the contrast index $Ct$, it is apparent from formula (1) that $F_1$ or the output luminance is enlarged or $E_2$ or the intensity of the fluorescent surface reflection external light is reduced. In order to reduce $E_2$, it is understood from formula 4 that it is effective to reduce the light transmittance $Tp$ of the face plate 2. Hence, as a method for improving the contrast efficiency of the cathode-ray tube, it is often practiced to reduce the light transmittance $Tp$ of the face plate 2. In this case, there is a disadvantage, that is, the output luminance $F_1$ of the cathode-ray tube is simultaneously reduced, which is clear from formula (2).

FIG. 2 illustrates optical characteristics of the face plate 2 and the fluorescent surface. In FIG. 2, the BGR indicates relative emission intensity spectral distribution of the emission from the BGR three color fluorescent material layer 4. Further, in FIG. 2, curves II, III, IV and V denote spectral transmittance distribution of the face plate 2 with the glass having a thickness of 13 mm. II is a clear type with approximately 85% of the spectral transmittance of the visible light area; III is a gray type with approximately 69% of the same; IV is a tint type with approximately 50% of the same; and V is a dark gray type with approximately 38% of the same.

On the other hand, the lower the spectral transmittance of the face plate 2, the larger the absorption of the light emitted from the fluorescent surface of the cathode-ray tube at the face plate 2. Thus, the luminance efficiency decreases. This is clear from the relationship between the relative emission intensity spectral distribution of the BGR fluorescent surface and the spectral transmittance shown in FIG. 2. However, as is apparent from formula (4), since $E_2$ largely decreases, the external light incident to the fluorescent surface of the cathode-ray tube can be effectively removed, and this is advantageous for the contrast. With the tendency of attaching importance to the image quality of the recent color TV receiver, the face plate 2 of the tint type or dark tint type which highly values the contrast efficiency rather than a conventional clear type or gray type which highly values the luminance efficiency, has been much more used.

Further, with the enlarging of the recent cathode-ray tube and the improvement of the luminance efficiency and the focusing efficiency of the same, the voltage to be applied to the fluorescent surface of the cathode-ray tube, i.e., the acceleration voltage of the electron beam has been raised, and a charge-up phenomenon, i.e., electrification caused by accumulation of electric charges on the face part of the color TV receiver has become a large problem. That is, by this charge-up phenomenon, the fine dust in the air is attached to the face part, and the dirt or the like is liable to become conspicuous. As a result, it becomes a cause for making the luminance efficiency of the cathode-ray tube worse. Further, when a viewer comes up to the charged-up face part, a discharge phenomenon occurs to give an unpleasant feel to the viewer. Hence, in addition to the improvement of the contrast efficiency, the demand for preventing the electrification of the face part has been strong.

In order to carry out the charge prevention of the electrification of the face part of the color TV receiver and the further improvement of the contrast efficiency of the image, as shown in FIG. 3, a cathode-ray tube 1 provided with an antistatic light selective absorption film 3 on the external surface of the face plate 2 has been used. This antistatic light selective absorption film 3 is composed of a silica ($SiO_2$) film and possesses both an antistatic function and a light selective absorption function. For forming such an antistatic light selective absorption film 3, in general, to a base coating of an alcohol solution of a silicon (Si) alkoxide having a function group such as —OH group or —OR group, tin oxide ($SnO_2$) or indium oxide ($In_2O_3$) fine particles as an electrically conductive filler are dispersed and mixed, and then an organic or inorganic dye or pigment is dispersed and mixed to obtain a coating liquid. This coating liquid is applied to the external surface of the face plate 2 of the cathode-ray tube to form a coating film thereon. After the formation of the coating film, in order to obtain a strong film strength, a baking processing of the film at a temperature of 100° to 200° C. is conducted.

FIG. 4 shows a cross section of the antistatic light selective absorption film 3 formed on the external surface of the face plate 2. In FIG. 4, in the structure of this film 3, the organic or inorganic dye or pigment particles 8 and conductive filler particles 9 are dispersed in the porous silica film 7.

FIG. 5 shows the surface voltage change of the face plate part of the cathode-ray tube. In FIG. 5, L and $L_1$ indicate variation curves of the surface voltage when the power of the cathode-ray tube having no antistatic function is on (L) or off ($L_1$), and M and $M_1$ indicate variation curves of the surface voltage when the power of the cathode-ray tube having an antistatic function is on (M) or off ($M_1$). In the cathode-ray tube having an antistatic function, a conductive film is formed on the external surface of the face plate 2. Further, since this conductive film is connected to the ground, the surface charges are always released to the ground with the result of largely reducing the charge-up.

Then principle for improving the contrast efficiency by the antistatic light selective absorption film 3 will now be described with reference to FIG. 6.

FIG. 6 is the same as FIG. 1 except that an antistatic light selective absorption film 3 is additionally formed on the external surface of the face plate 2.

Further, the optical refraction index of the glass material of the face plate 2 is determined to be almost the same as that of the antistatic light selective absorption film 3. Thus the light reflection at the interface between these two members can almost be ignored. In this case, a contrast efficiency C't can be expressed in the same manner as described above relating to formula (1) by the following formula:

$$C_t = \frac{(E_1 + E_2) + F_1}{E_1 + E_2} = 1 + \frac{F_1}{E_1 + E_2} \quad (5)$$

wherein, $$F_1 = F_o \cdot Tb \cdot Tp \cdot Tc \quad (6)$$

$$E_1 = 0.04 E_o \quad (7)$$

$$E_2 = (0.96)^2 E_o \cdot Tp^2 \cdot Tc^2 \{0.04 + (0.96)^2 Rp\} \quad (8)$$

In the above-described formulas, since $E_1$ is constant, when Tp is also constant, in order to further improve the contrast efficiency C't, it is effective to decrease the light transmittance Tc of the antistatic light selective absorption film 3 according to formulas (5) and (8). In case of the antistatic light selective absorption film 3, by optimizing the spectral transmittance distribution in the visible light area of the antistatic light selective absorption film 3 and the relative emission intensity spectral distribution of the emission from the BGR three color fluorescent material layer 4, the reduction of the output luminance $F'_1$ represented by formula (6) can be controlled to be as low as possible so as to improve the contrast efficiency C't.

In FIG. 2, a curve I shows one example of the spectral transmittance distribution of the antistatic light selective absorption film 3 formed on the external surface of the face plate 2 of the cathode-ray tube for the above-described purpose.

In FIG. 2, since, when an absorption peak A of the antistatic light selective absorption film 3 exists in a part near a main spectrum wavelength 535 nm to 625 nm of the relative emission intensity spectral distribution of the GR, it becomes disadvantageous in the luminance efficiency of the fluorescent surface of the cathode-ray tube, the absorption peak A of the absorption range is usually determined in a range of 570 nm to 610 by considering the half value width of the absorption range or the like as well.

Since the light having a wavelength in this range is coincident with a relatively high range of visual sense of eyes of a human being, the absorption or removal of the light component in this range from the external light (usually the white light) components is preferable for the contrast efficiency. That is, by setting the peak A of the absorption range to the wavelength range 570 nm to 710 nm which is relatively high as the visual sense of the humans' eyes, and gives influences as small as possible to the emission from the fluorescent surface (small absorption against the emission of the BGR) with regard to the optical properties of the antistatic light selective absorption film 3 of the cathode-ray tube 1, not only the luminance efficiency of the fluorescent surface is maintained but also the external light is effectively absorbed to improve the contrast efficiency.

In this case, the selection of the organic or inorganic dye or pigment having such optical characteristics is very important. In the case of the curve I shown in FIG. 2, the absorption peak A of the absorption range is set to 580 nm. In such a cathode-ray tube with an antistatic light selective absorption film, since the optical characteristics of the organic or inorganic dye or pigment to be mixed with the base coating are relatively broad, concerning the emission of the fluorescent surface, for example, in the case of the green (G) color emission, a tail part in the long wavelength side of the main spectral wavelength or in the case of the red (R) color emission, a subpeak part in the short wavelength side of the main spectral wavelength is absorbed by this antistatic light selective absorption film. Further, the improvement of the emission color tone can be simultaneously carried out.

FIG. 7 shows an intensity $E_o=100$ of an external light incident to the external surface of various kinds of face plates 2 of a cathode-ray tube, intensities $E_1$ of the external light reflected by the external surface of the face plates 2, intensities $E_2$ of the external light reflected by the internal surface of the face plates 2 and the fluorescent surface and coming out of the face plates 2, and rates of the surface reflected external light per the entire reflected external light $[\{E_1/(E_1+E_2)\}\cdot 100]$.

In this case, regarding the intensities $E_1$ of the surface reflected external light, in case of face plates k, l, m and n all made of glass materials, the external light is reflected by their external surfaces and in case of face plates o and p formed with an antistatic light selective absorption film 3 having approximately the same optical refraction index as that of the glass materials, the external light is reflected by the external surface of the antistatic light selective absorption film 3. Hence, the intensities $E_1$ are all approximately 4.0. As to the intensities $E_2$ of the fluorescent surface reflected external light, they depend on the light transmittance of the face plate 2 and the antistatic light selective absorption film 3 formed on its external surface further, as these light selection rates decrease, the intensities $E_2$ are suddenly reduced. When the measurement and the evaluation are conducted, an incandescent lamp having relative emission intensity spectral distribution shown in FIG. 8 is used as the external light.

As is apparent from FIG. 7, when the light transmittance of the face plate 2 is relatively high like the face plates k and l, $E_2$ is very high as compared with $E_1$. That is the value $[\{E_1/(E_1E_2)\}\cdot 100]$ is small, and the influence of $E_1$ can be ignored. When the light transmittance of the face plate 2 is lowered like the face plates m and n, $E_1$ and $E_2$ become close, and the influence of $E_1$ can not be ignored. When the light absorption film is formed on the external surface of the face plate 2 whose light transmittance is originally low like the face plates o and p, this tendency becomes further remarkable.

In this instance, phenomenally, in order to improve the contrast efficiency of the cathode-ray tube, the lower the light transmittance of the face plate 2 is reduced and further, the lower the light transmittance is reduced by forming the light absorption film on the external surface of the face plate 2, the more the surface external light reflection by the face plate 2 becomes conspicuous. For instance, the face or the like of the viewer, reflected on the face plate part of the cathode-ray tube is clearly seen by the viewer, and the reflected image obstructs the view very much. Further, when the image is kept on for a long time, it can cause eye fatigue. This conspicuous surface external light reflection problem is marked very much. In particular, when the light transmittance of the face plate 2 is less than 50%, and further, when the light absorption film such as the antistatic light selective absorption film 3 is formed on the external surface of such a face plate 2, the problem becomes more serious.

As described above, in the cathode-ray tube, in order to improve the contrast efficiency, the lower the light transmittance of the face plate 2 is reduced and further the lower the light transmittance is reduced by forming the light absorption film on the external surface of the face plate 2, the more the surface external light reflection of the face plate 2 becomes conspicuous. Due to this reflected image, it becomes hard for the viewer to see the TV image, and the eye fatigue is caused to the viewer.

SUMMARY OF THE INVENTION

It is therefore an object of the present invention to provide a cathode-ray tube with a low reflectivity film in view of the aforementioned problems of the prior art, which is capable of reducing light transmittance of a face plate in order to improve contrast efficiency of the cathode-ray tube and reducing reflected image by an external light even when a light absorption film is formed on an external surface of the face plate and which can be produced at a low cost.

A cathode-ray tube according to the present invention comprises a face plate having a light transmittance of at most 50%, and a silica type of an optical film with a fixed thickness, formed on the external surface of the face plate, and the optical film is dispersed and mixed with magnesium fluoride ($MgF_2$) superfine particles having an average particle size of at most 100 nm.

Since the silica ($SiO_2$) type of the optical film with the fixed thickness is dispersed with the magnesium fluoride superfine particles having the average particle size of at most 100 nm, the external light reflection at the external surface of the face plate can be reduced, and the influences such as the reflected image or the like by the external light can be reduced.

Further, the present invention provides a cathode-ray tube with a low reflectivity film, formed with a reflectivity reduction film formed on a face plate having a light transmittance of at most 50%, and the reflectivity reduction film is composed of a multilayer optical interference film obtained by alternately laminating 2 to 4 layers of high and low refraction index layers based on the silicon (Si) alkoxide. The low refraction index layer is formed by a coating film of a low refraction index base coating of an alcohol solution of the silicon (Si) alkoxide having at least one of —OH group and —OR group as a functional group or a low refraction index base coating obtained by dispersed and mixed with magnesium fluoride ($MgF_2$) superfine particles having an average particle size of at most 100 nm to the alcohol solution of the silicon (Si) alkoxide having at least one of —OH group and —OR group as a functional group. The high refraction index layer is formed by a coating film of a base coating obtained by dispersing and mixing superfine particles with an average particle size of at most 100 nm of at least one of titanium oxide ($TiO_2$), tantalum oxide ($Ta_2O_5$), zirconium oxide ($ZrO_2$), zinc sulfide ($ZnS$) and a mixture thereof to an alcohol solution of a silicon alkoxide having at least one of —OH group and —OR group as a functional group.

Even when the face plate having the light transmittance of at most 50% is used, by the reflectivity reduction film which is formed on the external surface of the face plate and is composed of a multilayer optical interference film formed by a combination of 2 to 4 layers of the high and low refraction index layers based on the silicon (Si) alkoxide, the external light reflection at the external surface of the face place can be reduced, and the influences such as the reflected image and the like by the external light can be effectively reduced at a low cost.

Further, in order to form the coating films, organic or inorganic dye or pigment is dispersed and mixed to the base coatings.

By dispersing and mixing the organic or inorganic dye or pigment to the base coatings, the high and low refraction index layers are colored, and in addition to the contrast improvement, since the optical characteristics of the organic or inorganic dye or pigment to be mixed with the base coating are relatively broad, concerning the emission of the fluorescent surface, for example, in case of the green (G) color emission, a tail part in the long wavelength side of the main spectral wavelength or in case of the red (R) color emission, a sub-peak part in the short wavelength side of the main spectral wavelength is absorbed by this antistatic light selective absorption film, and the improvement of the emission color tone can be simultaneously carried out.

Also, to a base coating, tin oxide ($SnO_2$) or indium oxide ($In_2O_3$) electrically conductive fine particles as an electrically conductive filler are dispersed and mixed.

Further, the electrically conductive filler is dispersed and mixed to only the high refraction index base coating.

By dispersing and mixing the tin oxide or indium oxide electrically conductive fine particles as an electrically conductive filler to the base coating, the antistatic function can be given, and the refraction index can be increased. Particularly, by dispersing and mixing such an electrically conductive filler to only the high refraction index base coating, the refraction index of the high refraction index layer can be increased, and the refraction index of the low refraction index layer can be relatively reduced. As a result, as a whole, the optical characteristics of the low refraction index layer can be largely improved.

BRIEF DESCRIPTION OF THE DRAWINGS

The above and other objects, features and advantages of the present invention will more fully appear from the following description of the preferred embodiments with reference to the accompanying drawings, in which:

FIG. 7 shows reflection characteristics such as intensities of external light reflected by various face plates of a conventional cathode-ray tube;

FIG. 11 shows reflection characteristics of face plates of the first embodiment of the cathode-ray tube according to the present invention;

FIG. 14 shows reflection characteristics of face plates of the second embodiment of the cathode-ray tube according to the present invention;

FIG. 16 shows reflection characteristics of face plates of the third embodiment of the cathode-ray tube according to the present invention;

FIG. 18 shows reflection characteristics of face plates of the fourth embodiment of the cathode-ray tube according to the present invention.

DESCRIPTION OF THE PREFERRED EMBODIMENTS

Figure 1:
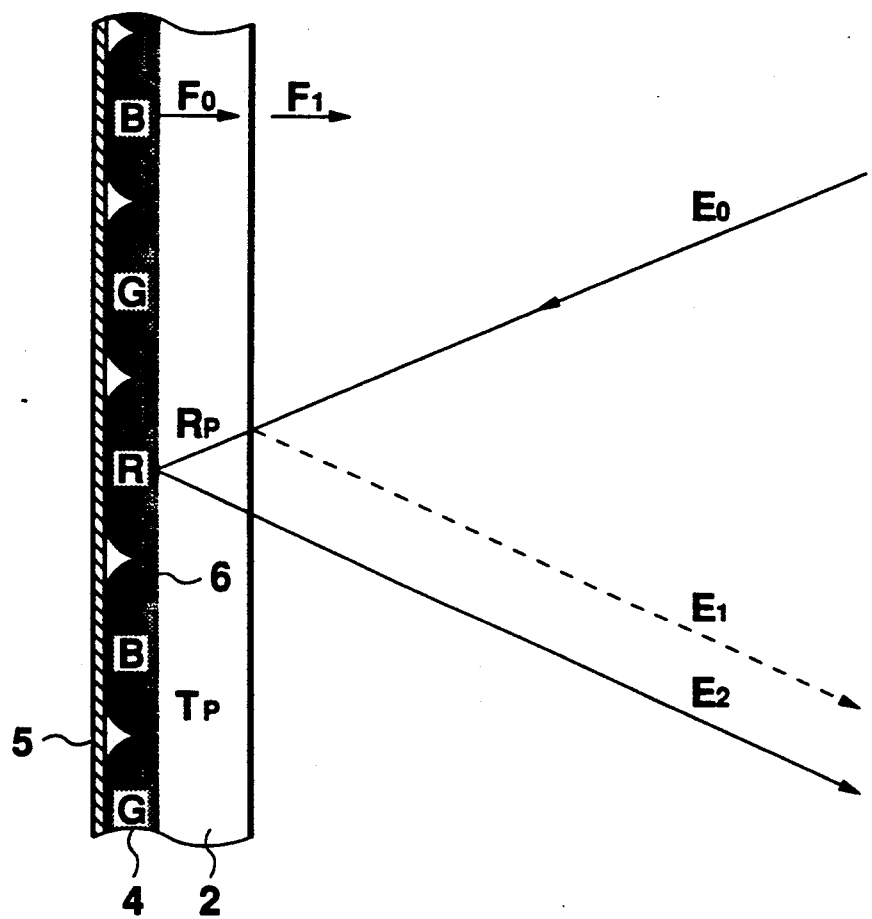
FIG. 1 is an enlarged fragmentary cross section of a fluorescent surface part of a conventional cathode-ray tube.
Figure 2:
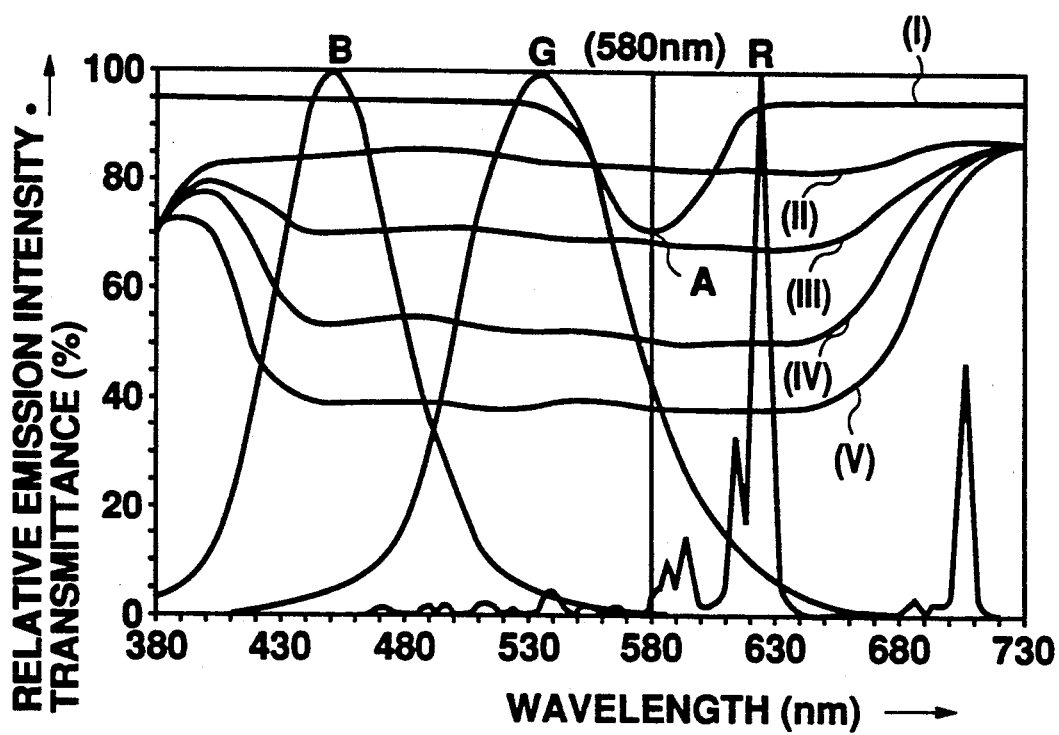
FIG. 2 is a graphical view of spectral transmittance distribution of a face plate part of a conventional cathode-ray tube.
Figure 3:
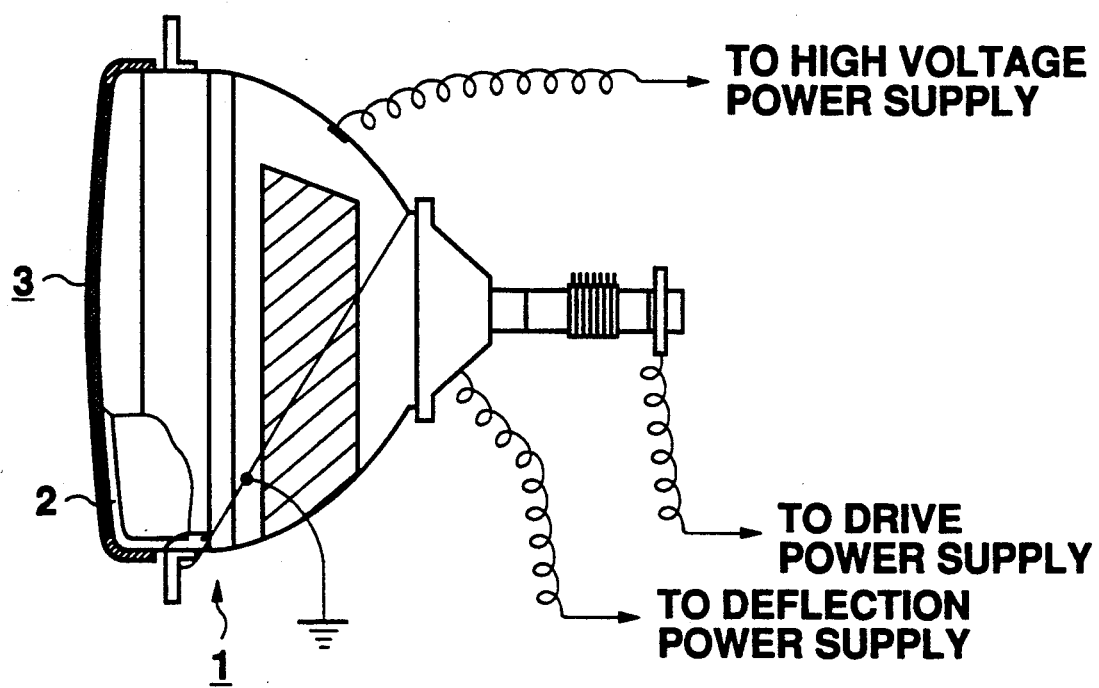
FIG. 3 shows a structure of a conventional cathode-ray tube with an antistatic light selective absorption film.
Figure 4:
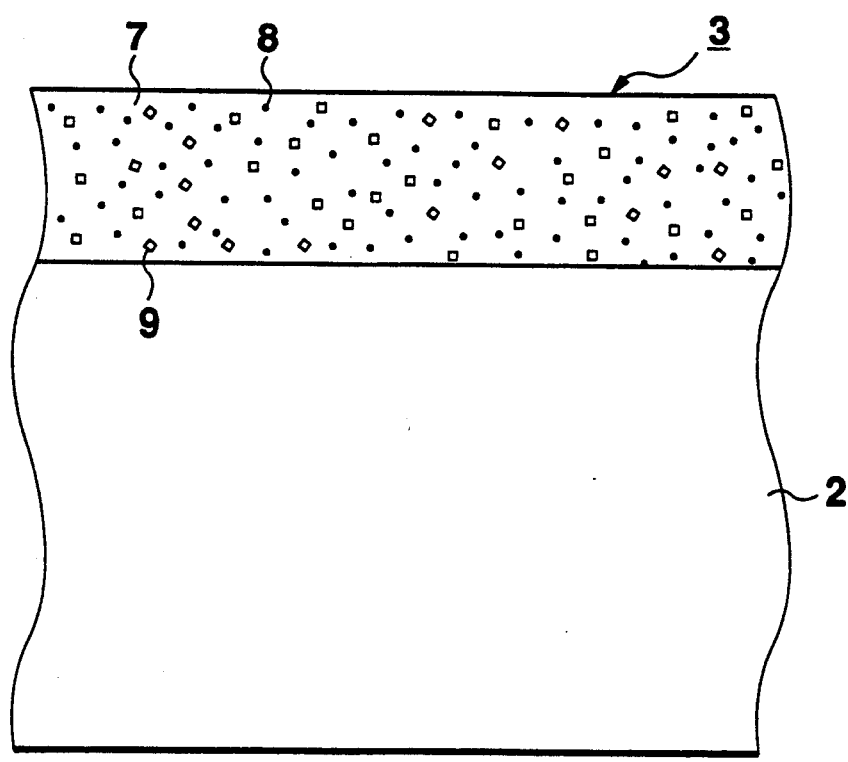
FIG. 4 is an enlarged fragmentary cross section of an antistatic light selective absorption film shown in FIG. 3.
Figure 5:
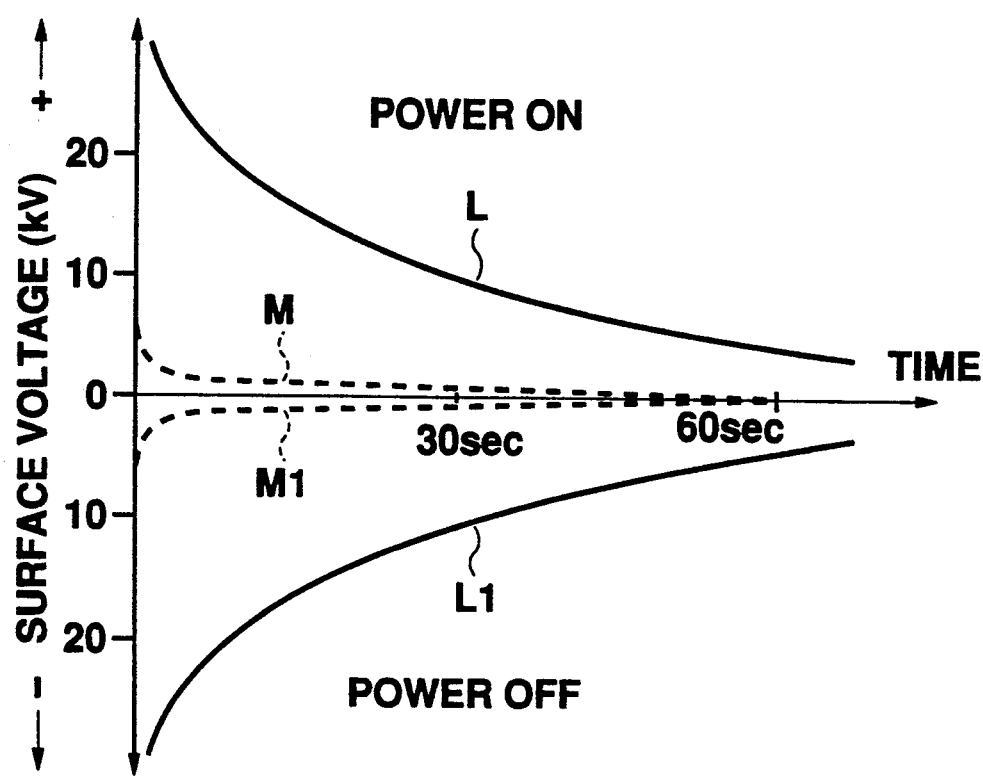
FIG. 5 is a graphical view of a surface voltage change of a face plate part of a conventional cathode-ray tube.
Figure 6:
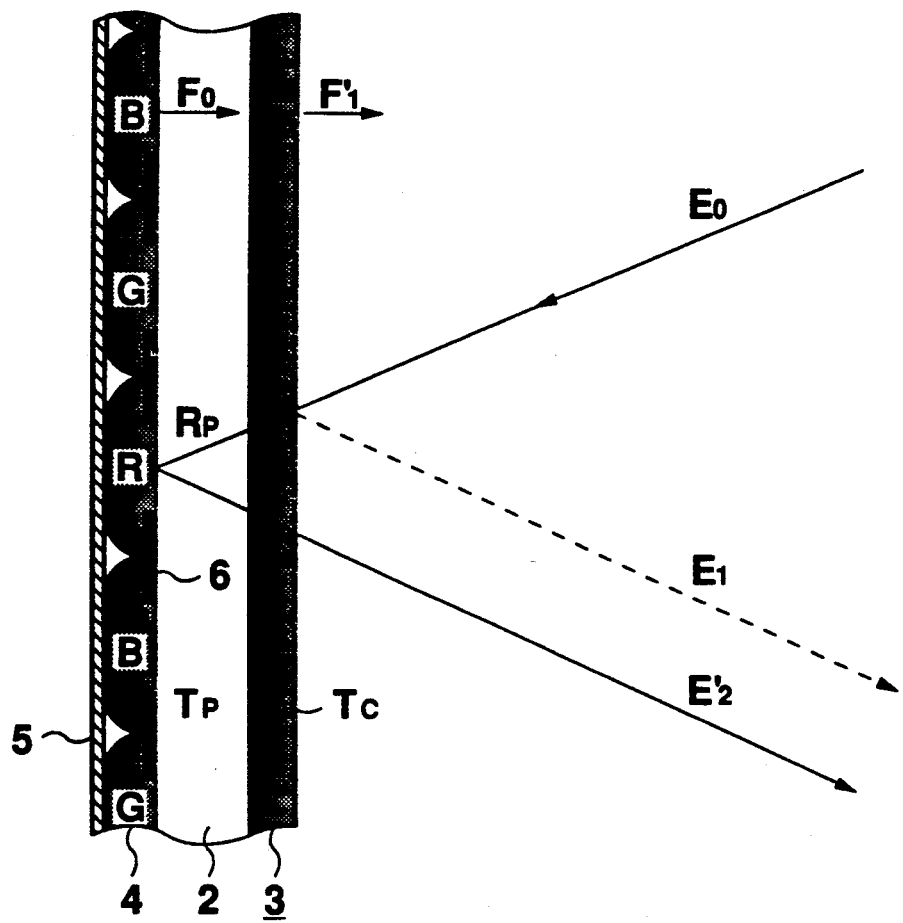
FIG. 6 is an enlarged fragmentary cross section of a fluorescent surface part of a conventional cathode-ray tube with an antistatic light selective absorption film.
Figure 8:
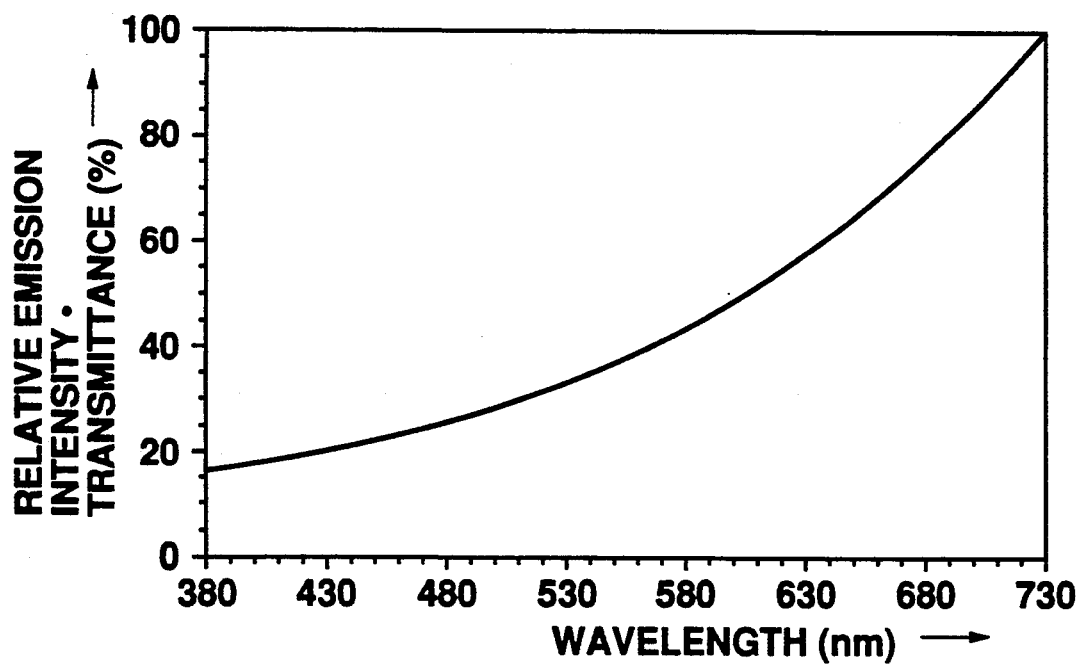
FIG. 8 is emission spectral distribution of an incandescent lamp used for surface reflection measurement and evaluation of a conventional cathode-ray tube.

The present invention will now be described in detail with reference to the accompanying drawings wherein like reference characters designate like or corresponding parts throughout the several views and thus the repeated description thereof can be omitted for brevity.

A first embodiment of the present invention will now be described in detail in connection with FIGS. 9 to 11.

Figure 9:
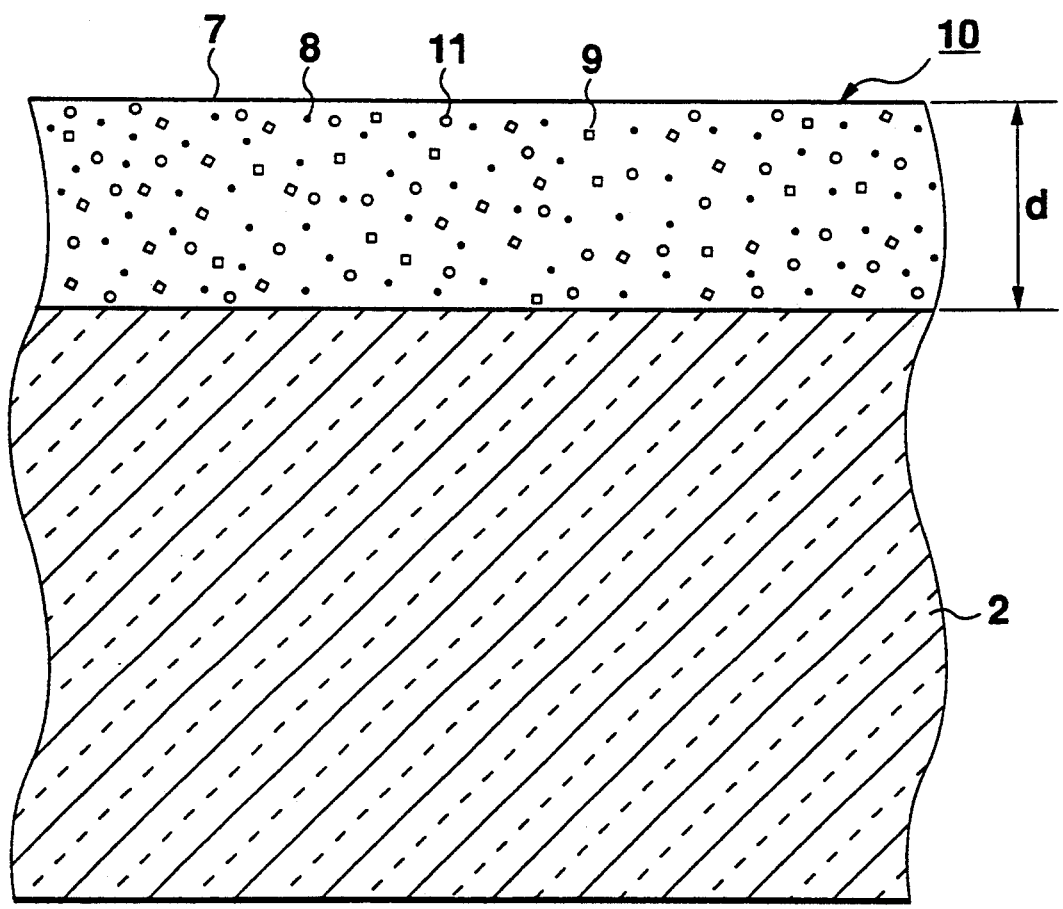
FIG. 9 is an enlarged fragmentary cross section of a face plate part of a first embodiment of a cathode-ray tube according to the present invention.

In FIG. 9, there is shown a face plate part of the first embodiment of a cathode-ray tube with a low reflectivity film according to the present invention. In FIG. 9, an antistatic light selective absorption type reflectivity reduction film 10 with a thickness d is formed on an external surface of the face plate 2. This antistatic light selective absorption type reflectivity reduction film 10 is different from a conventional antistatic light selective absorption film 3 in that in addition to organic or inorganic dye or pigment particles 8 and electrically conductive filler particles 9, magnesium fluoride superfine particles 11 are dispersed and mixed in a porous silica film 7.

The average particle size of the magnesium fluoride superfine particles 11 is at most 100 nm, preferably at most 30 nm from viewpoints of which a refraction index is effectively reduced and a uniform film is obtained.

In case of the conventional antistatic light selective absorption film 3, the organic or inorganic dye or pigment particles 8 and electrically conductive filler particles 9 are dispersed and mixed in the porous silica film 7, and depending on kinds of mixture materials, the refraction index of the formed film is 1.5 to 1.54 which is almost the same as that of the glass materials for the face plate 2 of the base. As examples of the electrically conductive filler particles 9, tin oxide ($SnO_2$), indium oxide ($In_2O_3$) and the like are preferably used.

However, in this embodiment, since the magnesium fluoride ($MgF_2$) itself is a material having a very low refraction index ($n \approx 1.38$), by adding a fixed amount of the magnesium fluoride superfine particles 11, a refraction index of a light absorption film is reduced to approximately 1.4 to obtain an optical film having a low refraction index.

It is well-known that by forming a film with a certain thickness, having a lower refraction index than a glass on the surface of the glass, the reflection at the surface of the glass can be reduced. That is, assuming that a refraction index of a film to be formed on the surface of a glass, a thickness of the film and a wavelength of an incident light are n, d, and λ, respectively, a surface reflection can be controlled to the minimum by suitably determining the thickness d of the film so that the following formula may be satisfied.

$$nd = \frac{\lambda}{4}(2m - 1)$$

wherein m is a positive integer of at least 1, for example, preferably 1 or 2. At this time, the surface reflection R is expressed by the following formula, $$R = (n^2 - n_o n_g)^2/(n^2 + n_o n_g)^2$$

wherein $n_o$ is a refraction index of the air, and $n_g$ is a refraction index of the glass.

In this embodiment, the antistatic light selective absorption type reflectivity reduction film 10 is formed on the external surface of the face plate 2 composed of the glass having the refraction index of 1.5 to 1.54, and the refraction index of the antistatic light selective absorption type reflectivity reduction film 10 is reduced to approximately 1.4 by dispersing and mixing the magnesium fluoride superfine particles 11 having a low refraction index in the porous silica film 7. Hence, by controlling the thickness d of the antistatic light selective absorption type reflectivity reduction film 10 to a fixed value, the surface reflection of the external light at the surface of the face plate 2 can be reduced, and it is desirable to effectively absorb or remove the light component having a wavelength range of 480 to 620 which is a relatively high range of visual sense of eyes of a human being from the external light (usually the white light). Therefore, it is preferable to determine the film thickness d so that the following formula may be satisfied, $$480 \text{ nm} \leq \frac{4nd}{2m - 1} \leq 620 \text{ nm}$$

wherein m is a positive integer of at least 1, for example, preferably 1 or 2. In this embodiment, by determining $m=1$ and $d=\lambda/4$ against the central wavelength 550 nm, $d \approx 138$ nm is obtained.

Further, in order to control a film thickness of a coating liquid to a fixed value, the application of the coating liquid is carried out by a spin coat method. In the spin coat method, it is necessary to strictly control the conditions such as a rotation number in the spin coat operation, an overrange time, a viscosity of the coating liquid, solid components and temperature, a surface temperature of the face plate 2, temperature and humidity of an application and dry booth and so on. After the film formation by the spin coat method, the film is cured at a temperature of 100° C. to 200° C.

Figure 10:
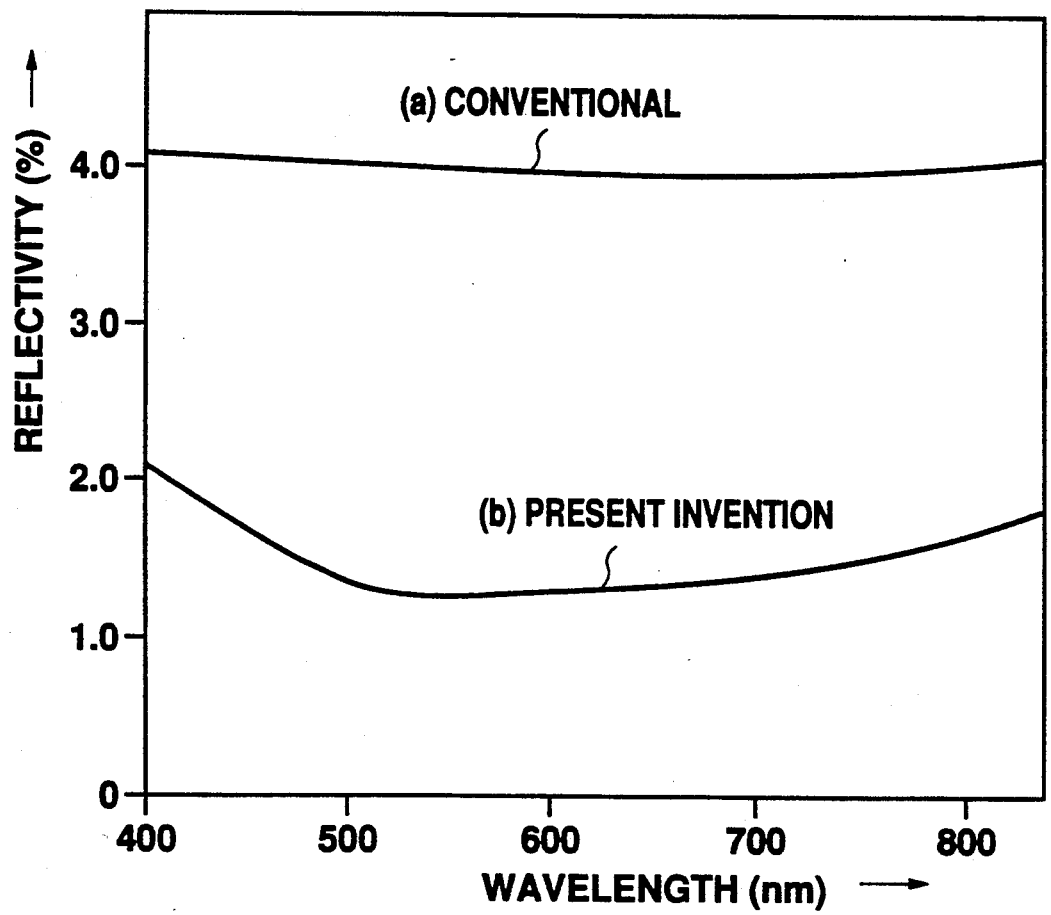
FIG. 10 is a graphical view showing surface spectral reflectivity of an external surface of a face plate of the cathode-ray tube shown in FIG. 9.

FIG. 10 shows a surface spectral reflectivity (a) of a conventional antistatic light selective absorption film 3 formed on the external surface of the face plate 2 of the cathode-ray tube and a surface spectral reflectivity (b) of an antistatic light selective absorption type reflectivity reduction film 10 formed in this embodiment according to the present invention. In the conventional case, approximately 4% of surface reflection in the visible light area is obtained, but in the present case, the surface reflection is reduced to approximately 1.5%.

FIG. 11 shows optical characteristics of various face plates $m_1$, $n_1$, $o_1$ and $p_1$ formed with an antistatic light selective absorption type reflectivity reduction film 10 formed in the first embodiment of the present invention on its external surface, that is, an intensity $E_o=100$ of an external light incident to the face plates 2 of a cathode-ray tube, intensities $E_1$ of the external light reflected by the external surface of the face plates 2, intensities $E_2$ of the external light reflected by the internal surface of the face plates 2 and the fluorescent surface and coming out of the face plates 2, and rates of the surface reflected external light per the entire reflected external light $[\{E_1/(E_1+E_2)\} \cdot 100]$. As compared with the conventional face plates m, n, o and p shown in FIG. 7, the surface reflection external light rates of the present face plates $m_1$, $n_1$, $o_1$ and $p_1$ are reduced to approximately ½, and it is readily understood that a large improvement is achieved.

A second embodiment of the present invention will now be described in detail with reference to FIGS. 12 to 14.

Figure 12:
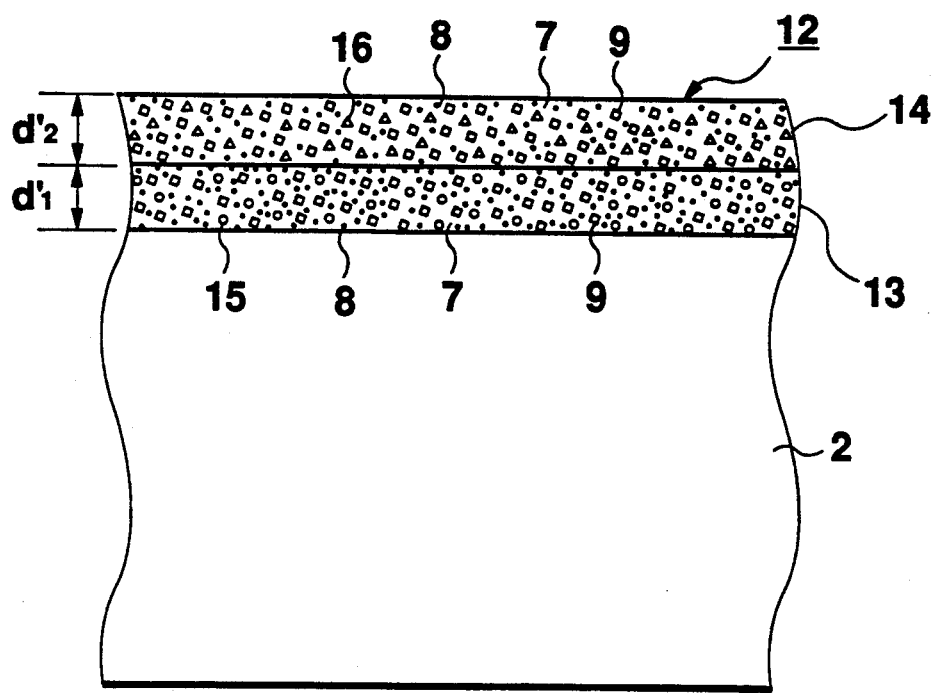
FIG. 12 is an enlarged fragmentary cross section of a face plate part of a second embodiment of a cathode-ray tube according to the present invention.

In FIG. 12, there is shown a face plate part of the second embodiment of a cathode-ray tube with a low reflectivity film according to the present invention. In this embodiment, on the external surface of the face plate 2, a reflectivity reduction film 12 is formed and is composed of a combination of a high refraction index layer 13 having a fixed thickness of $d'_1$ and a low refraction index layer 14 having a fixed thickness of $d'_2$ formed thereon.

Then, the reflectivity reduction film 12 composed of the combination of the high refraction index layer 13 and the low refraction index layer 14 will now be described more specifically.

First, after the external surface of the face plate 2 is sufficiently cleaned, to a coating liquid obtained by dispersing and mixing an antistatic electrically conductive filler and a coloring dye or pigment in an alcohol solution of a silicon (Si) alkoxide for use in forming a conventional antistatic light selective absorption film, a fixed amount of titanium oxide ($TiO_2$) superfine particles having an average particle size of 40 nm are mixed for achieving a high refraction index of the coating liquid to prepare a high refraction index coating liquid. The obtained high refraction index coating liquid is applied to the cleaned external surface of the face plate 2 with a thickness of $d'_1$ by the spin coat method in the same manner as a conventional method to form the high refraction index layer 13.

In the high refraction index layer 13, as shown in FIG. 12, in addition to the organic or inorganic dye or pigment particles 8 and the electrically conductive filler particles 9, the titanium oxide ($TiO_2$) superfine particles 15 are dispersed and mixed in the porous silica film 7. In the state of the film 13 where no titanium oxide ($TiO_2$) superfine particles 15 are added, the refraction index of this film is 1.50 to 1.54 which is almost the same as that of the glass material for the face plate of the base. Since the titanium oxide ($TiO_2$) having the refraction index of approximately 2.35 is a high refraction index material, by adding a fixed amount of the titanium oxide ($TiO_2$) superfine particles 15 to the film containing the organic or inorganic dye or pigment particles 8 and the electrically conductive filler particles 9, the refraction index of this film can be increased up to approximately 1.8 to form the high refraction index layer 13. As regards the high refraction index material for using for such a purpose, superfine particles of tantalum oxide ($Ta_2O_5$), zirconium oxide ($ZrO_2$), zinc sulfide (ZnS) and a mixture thereof can be used. Also, the average particle size of the superfine particles of the high refraction index material is at most 100 nm, preferably at most 30 nm for viewpoints of which a refraction index is effectively reduced and a uniform film is obtained.

The high refraction index layer 13 applied and formed as described above is cured in a heating furnace. This is carried out for hardening the coating to a certain extent so as to prevent a cause of an elusion phenomenon from the high refraction index layer 13 even when a low refraction index coating liquid is applied on the high refraction index layer 13 to form the low refraction index layer 14 thereon. In this case, as the curing conditions, 20 minutes at a temperature of 80° C. is kept. This curing can be carried out by not only heating but also using ultraviolet radiation, a chemical or the like.

Then, after the curing of the high refraction index layer 13 is finished, to a coating liquid obtained by dispersing and mixing an antistatic electrically conductive filler and a coloring dye or pigment in an alcohol solution of a silicon (Si) alkoxide, a fixed amount of magnesium fluoride ($MgF_2$) superfine particles having an average particle size of 30 nm are mixed for achieving a low refraction index of the coating liquid to prepare a low refraction index coating liquid. The obtained low refraction index coating liquid is applied to the high refraction index layer 13 with a thickness of $d'_2$ by the spin coat method in the same manner as described above to form the low refraction index layer 14.

In the low refraction index layer 14, as shown in FIG. 12, in addition to the organic or inorganic dye or pigment particles 8 and the electrically conductive filler particles 9, the magnesium fluoride ($MgF_2$) superfine particles 16 are dispersed and mixed in the porous silica film 7. In the state of the film 13 where no magnesium fluoride ($MgF_2$) superfine particles 16 are added, the refraction index of this film is 1.50 to 1.54. Since the magnesium fluoride ($MgF_2$) having the refraction index of approximately 1.38 is a low refraction index material, by adding a fixed amount of the magnesium fluoride ($MgF_2$) superfine particles 16 to the film containing the organic or inorganic dye or pigment particles 8 and the electrically 9, the refraction conducted filler particles index of this film can be decreased to approximately 1.42 to form the low refraction index layer 14. The average particle size of the magnesium fluoride ($MgF_2$) superfine particles 16 for use in the low refraction index material is at most 100 nm, preferably at most 20 nm from viewpoints of which a refraction index is effectively reduced and a uniform film is obtained.

The obtained reflectivity reduction film 12 composed of the high refraction index layer 13 and the low refraction index layer 14 successively formed on the face plate 22 with the fixed film thicknesses is then baked, for instance, for 30 minutes at a temperature of 175° C. in the heating furnace. The baking processing carried out for stabilizing the optical characteristics and improving the strength of the reflectivity reduction film 12.

Relating to a film structure of a reflectivity reduction film of a multilayer optical interference film, assuming that a low refraction index layer having an optical thickness of approximately ¼ wavelength, a high refraction index layer having an optical thickness of approximately ¼ wavelength and a glass base plate are L, H and (S), respectively, in case of two layers, it is well-known that (S)-H-L and (S)-2H-L are basic structures. In this instance, 2H means ½ wavelength. In the case of 3 to 4 layer structures, combinations become a little complicated, but basically, the structures become the combinations of the above-described H and L.

The film structure shown in FIG. 12 is a case of (S)-H-L, and the optimization of the thicknesses $d'_1$ and $d'_2$ is carried out. In FIG. 13, (a) shows a surface spectral reflectivity of a face plate having no antistatic light selective absorption film 3 or a conventional antistatic light selective absorption film 3 on its external surface in a cathode-ray tube; and (b) shows a surface spectral reflectivity of a face plate of the second embodiment of the present invention, that is, a face plate formed with an antistatic light selective absorption type reflectivity reduction film composed of two layers, the reflectivity decreasing to 1.2% in average in the visible light area.

FIG. 14 shows optical characteristics of various face plates $m_2$, $n_2$, $o_2$ and $p_2$ formed with a reflectivity reduction film 12 formed in the second embodiment of the present invention on its external surface, that is, intensities $E_1$ and $E_2$ of the reflected external light from the face plate 2 and surface reflection rates [{$E_1/(E_1+E_2)$}·100] therefor in the same manner as the first embodiment shown in FIG. 11. As compared with the conventional face plates m, n, o and p shown in FIG. 7, the surface reflection external light rates of the present face plates $m_2$, $n_2$, $o_2$ and $p_2$ are reduced to approximately 40%, and it is readily understood that a large improvement is achieved.

Conventionally, regarding such a reflectivity reduction film 12, a high refraction index layer 13 is formed by a high refraction index material such as titanium oxide ($TiO_2$) with a fixed film thickness by using a vacuum deposition method, and a low refraction index layer 14 is also formed by a low refraction index material such as magnesium fluoride ($MgF_2$) by using the vacuum deposition method. As to the reflectivity reduction film formed by the vacuum deposition method, the fairly good optical properties can be obtained. However, a processing cost for the vacuum deposition method and the like is very expensive. Although the high cost method has already been introduced into a particular application such as a display monitor, in general, it is very difficult and costly to introduce such a high cost method into a fabrication of a color TV receiver for public use.

In this respect, according to the present invention, both high refraction index layer and low refraction index layer are formed by applying a coating liquid based on a silicon (Si) alkoxide on a face plate without using a vacuum deposition method, and a cathode-ray tube with a low reflectivity film of the present invention can be produced at a very low cost in mass production.

A third embodiment of the present invention will now be described in detail with reference to FIGS. 15 and 16.

Figure 15:
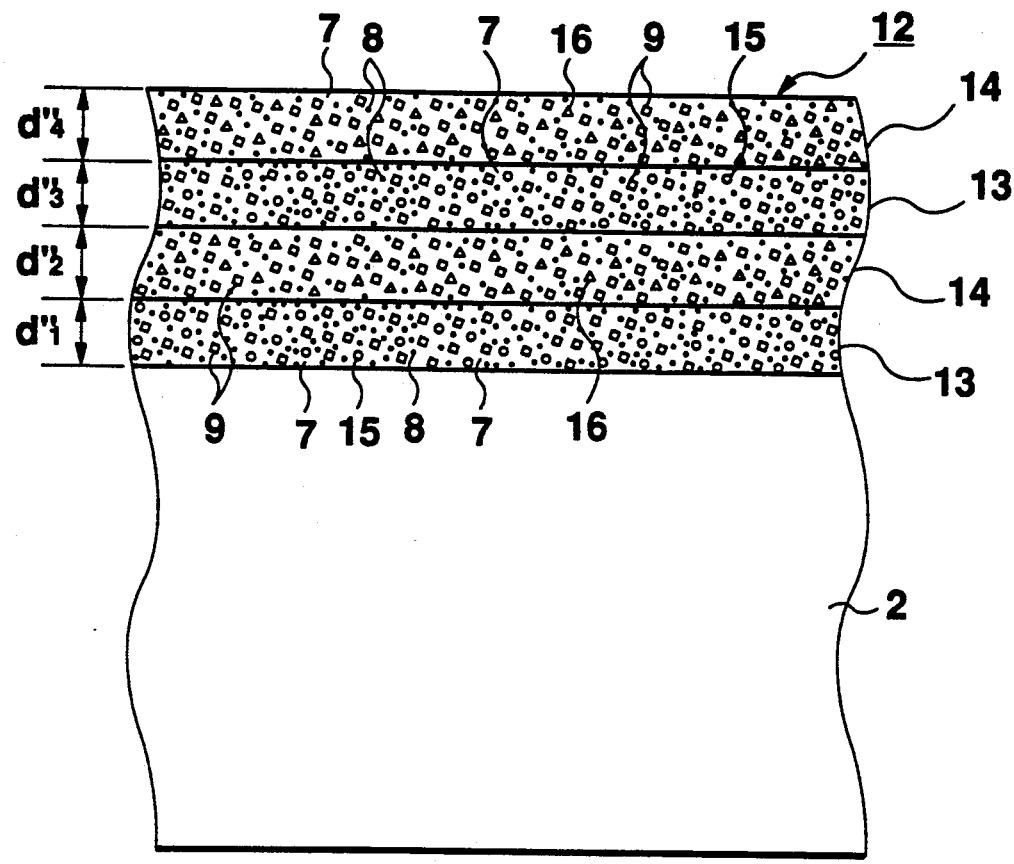
FIG. 15 is an enlarged fragmentary cross section of a face plate part of a third embodiment of a cathode-ray tube according to the present invention.

In FIG. 15, there is shown a face plate part of the third embodiment of a cathode-ray tube with a low reflectivity film according to the present invention. In this embodiment, on the external surface of the face plate 2, a reflectivity reduction film 12 composed of a combination of four layers of high and low refraction index layers 13 and 14 is formed. For example, the high refraction index layer 13 with a fixed thickness $d''_1$, the low refraction index layer 14 with a fixed thickness of $d''_2$, the high refraction index layer 13 with a fixed thickness of $d''_3$ and the low refraction index layer 14 with a fixed thickness of $d''_4$ are consecutively formed on the face plate 2. The formation of the reflectivity reduction film 12 is carried out by the same materials and processes as the first and second embodiments described above.

Figure 13:
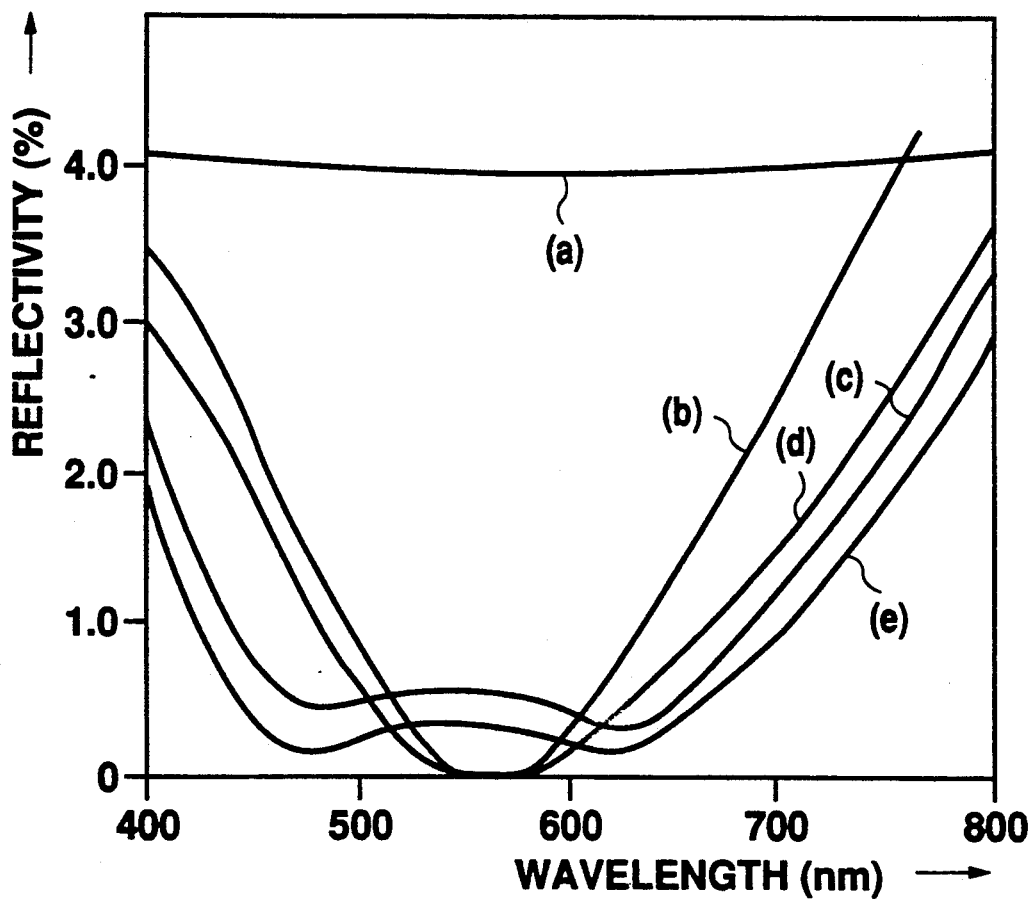
FIG. 13 is a graphical representation showing spectral reflectivity of a face plate part and a low reflectivity film of second to fourth embodiments of a cathode-ray tube according to the present invention.

In FIG. 13, (c) shows a surface spectral reflectivity of a face plate of the third embodiment of the present invention, that is, a face plate formed with a reflectivity reduction film composed of a combination of four layers, the reflectivity dropping to 0.5% on average in the visible light area. It is understood that the reflectivity reduction film of the four layers is very excellent when compared with the reflectivity reduction film 12 of the two layers in respect of largely reducing the surface spectral reflectivity in the visible light area.

FIG. 16 shows optical characteristics of various face plates $m_3$, $n_3$, $o_3$ and $p_3$ formed with a reflectivity reduction film 12 formed in the third embodiment of the present invention on its external surface, that is, intensities $E_1$ and $E_2$ of the reflected external light from the face plate 2 and surface reflection rates [{$E_1/(E_1+E_2)$}·100] therefor in the same manner as the first embodiment shown in FIG. 11. As compared with the conventional face plates m, n, o and p shown in FIG. 7, the surface reflection external light rates of the present face plates $m_3$, $n_3$, $o_3$ and $p_3$ are reduced to approximately 17%, and it is readily understood that a large improvement is achieved when compared with the second embodiment of the present invention.

A fourth embodiment of the present invention will now be described in detail with reference to FIGS. 17 and 18.

Figure 17:
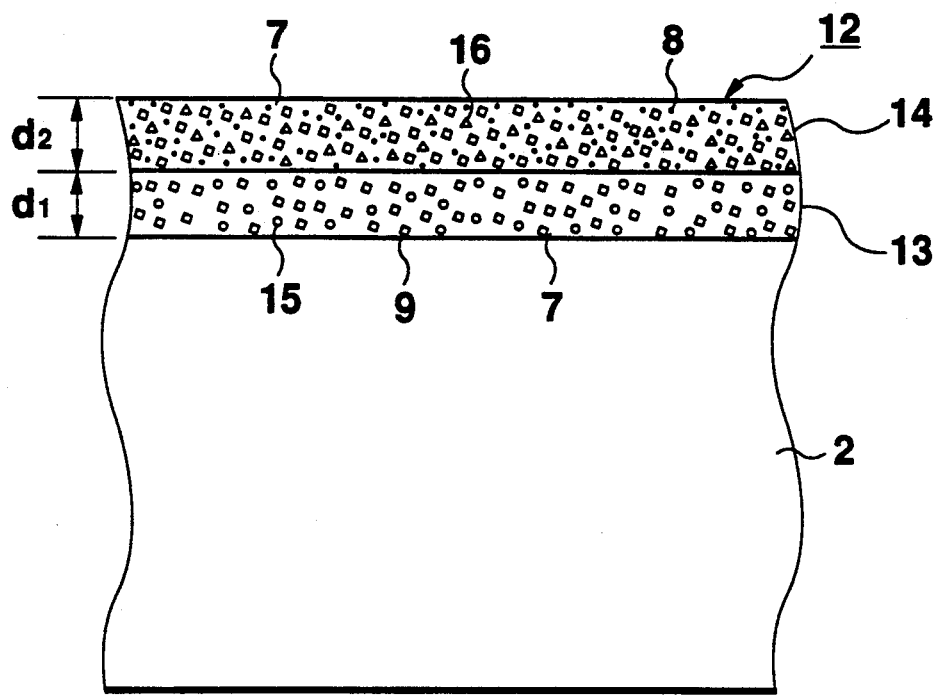
FIG. 17 is an enlarged fragmentary cross section of a face plate part of a fourth embodiment of a cathode-ray tube according to the present invention.

In FIG. 17, there is shown a face plate part of the fourth embodiment of a cathode-ray tube with a low reflectivity film according to the present invention. In this embodiment, on the external surface of the face plate 2, an improved reflectivity reduction film 12 composed of a combination of two layers of high and low refraction index layers 13 and 14 with respective fixed film thicknesses $d_1$ and $d_2$ is formed in the same in the second embodiment. In this embodiment, the electrically conductive filler particles 9 are dispersed and mixed only in the high refraction index layer 13, and the organic or inorganic dye or pigment particles 8 are dispersed and mixed only in the low refraction index layer 14.

In such a film structure, since the electrically conductive filler particles 9 originally possess a very high refraction index, the concentration of the electrically conductive filler particles 9 in the high refraction index layer 13 increases, and the refraction index of this film can be increased to approximately 1.95 compared with approximately 1.8 of the first embodiment. Also, since no electrically conductive filler particle 9 is present in the low refraction index layer 14, the refraction index of this film itself can be reduced to approximately 1.40 compared with approximately 1.42 of the second embodiment. Hence, the optical characteristics of the reflectivity reduction film 12 can be largely improved.

FIG. 13, (d) shows a surface spectral reflectivity of a face plate of the fourth embodiment of the present invention. That is, it shows a face plate formed with a reflectivity reduction film composed of a combination of two layers, the reflectivity dropping to 0.8% in average in the visible light area. In this connection, the surface spectral reflectivity of the reflectivity reduction film composed of two layers on the second embodiment falling to 1.2% in average, in the visible light area.

FIG. 18 shows optical characteristics of various face plate $m_4n_4$, $o_4$ and $p_4$ formed with a reflectivity reduction film 12 formed in the fourth embodiment of the present invention on its external surface, that is, intensities $E_1$ and $E_2$ of the reflected external light form the face plate 2 and surface reflection rates $[\{E_1/(E_1+E_2)\}\cdot 100]$, therefor in the same manner as the first embodiment shown in FIG. 11. As compared with the face plates $m_1$, $n_1$, $o_1$ and $p_1$ of the first embodiment, the surface reflection external light rates of the present face plates $m_4$, $n_4$, $o_4$ and $p_4$ are reduced to approximately 70%, and it is readily understood that a large improvement is achieved.

In this embodiment, as to the low refraction index layer 14, since, even when the magnesium fluoride ($MgF_2$) superfine particles 16 are not mixed, a certain extent of a low refraction index (approximately 1.45) can be realized, the alcohol solution of the silicon (Si) alkoxide can be used for a low refraction index base coating.

A fifth embodiment of the present invention will now be described in detail with reference to FIG. 19.

Figure 19:
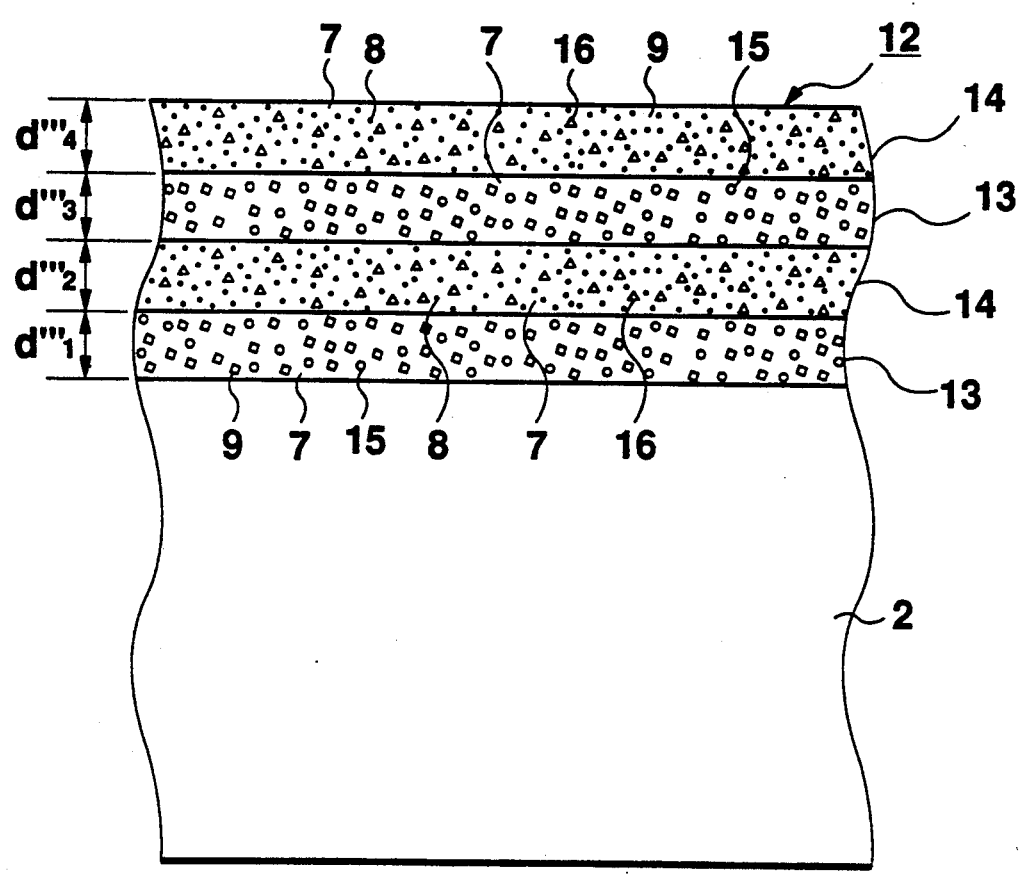
FIG. 19 is an enlarged fragmentary cross section of a face plate part of a fifth embodiment of a cathode-ray tube according to the present invention.

In FIG. 19, there is shown a face plate part of the fifth embodiment of a cathode-ray tube with a low reflectivity film according to the present invention. In this embodiment, on the external surface of the face plate 2, an improved reflectivity reduction film 12 composed of a combination of four layers of high and low refraction index layers 13 and 14 with respective fixed film thicknesses $d'''_1$, $d'''_2$, $d'''_3$ and $d'''_4$ is formed.

In this embodiment, by the same manner as the fourth embodiment, the refraction index can be increased more than that of the high refraction index layer 13 of the third embodiment and can be decreased more than that of the low refraction index layer 14 of the same. Hence, the optical characteristics of the reflectivity reduction film 12 can be largely improved.

In FIG. 13, (e) shows a surface spectral reflectivity of an antistatic light selective absorption type of a reflectivity reduction film formed on a face plate of the fifth embodiment of the present invention. Further, the reflectivity can be dropped to 0.25% on average in the visible light area.

In the above-described first to fifth embodiments, although an antistatic light selective absorption type of a reflectivity reduction film has been mainly described, the present invention is not restricted to these embodiments and can be applied when a film having only an antistatic function, a film having only a light selective absorption function or a film only having a reflectivity reduction function is formed on an external surface of a face plate having a light transmittance of at most 50%, for example.

Although the present invention has been described in its preferred embodiments with reference to the accompanying drawings, it is readily understood that the present invention is not restricted to the preferred embodiments and that various changes and modifications can be made by those skilled in the art without departing from the spirit and scope of the present invention.

What is claimed is:

1. A cathode-ray tube comprising:
   a face plate having a light transmittance of at most 50%, and
   a reflectivity reduction film formed on a front surface of the face plate, the reflectivity reduction film being a silicia layer having magnesium fluoride supefine particles having an average particle size of at most 100 nm dispersed therein;
   said reflectivity reduction film being of a predetermined thickness satisfying the following formula $$480 \leq 4nd/(2m-1) \leq 620$$

wherein d is a thickness of said reflectivity reduction film, n is a refractive index, and m is a positive integer.

2. The cathode-ray tube of claim 1, wherein said refraction index n of said reflectivity reduction film is approximately 1.4.

3. The cathode-ray tube of claim 2, wherein an average particle size of said magnesium fluoride superfine particles is at most 30 nm.

4. The cathode-ray tube of claim 3, wherein said reflectivity reduction film includes dye particles dispersed therein.

5. The cathode-ray tube of claim 3, wherein said reflectivity reduction film includes pigment particles dispersed therein.

6. A cathode-ray tube comprising:

a face plate having a light transmittance of at most 50%; and a reflectivity reduction film formed on a front surface of the face plate and including a high refraction index layer and a low refraction index layer alternately laminated;

said high refraction index layer being formed on said face plate and including superfine particles of at least one oxide selected from a group of oxides including, titanium oxide, tantalum oxide and zirconium oxide, said superfine particles being dispersed in silicia to form the high refraction layer, said superfine particles having an average particle size of at most 100 nm.

7. The cathode-ray tube of claim 6, wherein said low refraction index layer includes magnesium fluoride superfine particles having an average particle size of at most 100 nm dispersed in silicia.

8. The cathode-ray tube of claim 7, wherein said superfine particles of said high refraction index layer are titanium oxide.

9. The cathode-ray tube of claim 8, wherein a refraction index of the high refraction index layer is approximately 1.8 and a refraction index of the low refraction index layer is approximately 1.4.

10. The cathode-ray tube of claim 9, wherein said reflectivity reduction film includes a plurality of high refraction index layers and a plurality of low refraction index layers successively laminated on said face plate, one of said plurality of high refraction index layers being formed on said face plate.

11. The cathode-ray tube of claim 9, wherein said reflectivity reduction film includes a first high refraction index layer formed on said face plate, a first low refraction index layer formed on said first high refraction index layer, a second high refraction index layer formed on said first low refraction index layer, and a second low refraction index layer laminated on said second high refraction index layer.

12. The cathode-ray tube of claim 9, wherein said low refraction index layer and said high refraction index layer include dye particles dispersed therein.

13. The cathode-ray tube of claim 9, wherein said low refraction index layer and said high refraction index layer include electrically conductive fine particles of one oxide selected from a group of oxides including tin oxide and indium oxide as an electrically conductive filler.

14. The cathode-ray tube of claim 9, wherein only said low refraction index layer includes dye particles dispersed therein.

15. The cathode-ray tube of claim 14, wherein only said high refraction index layer includes an electrically conductive filler dispersed therein.

16. The cathode-ray tube of claim 9, wherein said low refraction index layer and said high refraction index layer include pigment particles dispersed therein.

17. The cathode-ray tube of claim 9, wherein only said low refraction index layer includes pigment particles dispersed therein.

* * * * *